United States Patent
Wijnands et al.

(10) Patent No.: US 9,154,412 B2
(45) Date of Patent: Oct. 6, 2015

(54) MULTICAST LABEL DISTRIBUTION PROTOCOL OVER A REMOTE LOOP-FREE ALTERNATIVE

(71) Applicant: Cisco Technology, Inc., San Jose, CA (US)

(72) Inventors: Ijsbrand Wijnands, Leuven (BE); Stefan Olofsson, Dubai (AE)

(73) Assignee: Cisco Technology, Inc., San Jose, CA (US)

( * ) Notice: Subject to any disclaimer, the term of this patent is extended or adjusted under 35 U.S.C. 154(b) by 134 days.

(21) Appl. No.: 13/954,657

(22) Filed: Jul. 30, 2013

(65) Prior Publication Data

US 2015/0036685 A1    Feb. 5, 2015

(51) Int. Cl.
H04L 12/723    (2013.01)

(52) U.S. Cl.
CPC .................................. H04L 45/507 (2013.01)

(58) Field of Classification Search
None
See application file for complete search history.

(56) References Cited

U.S. PATENT DOCUMENTS

| | | | |
|---|---|---|---|
| 7,965,656 B1 | 6/2011 | Wijnands et al. | |
| 8,107,473 B2 | 1/2012 | Wijnands et al. | |
| 8,391,185 B2 | 3/2013 | Wijnands et al. | |
| 8,422,364 B2 | 4/2013 | Wijnands et al. | |
| 2012/0195312 A1 | 8/2012 | Wijnands et al. | |
| 2013/0121169 A1* | 5/2013 | Zhao et al. ................ | 370/242 |
| 2013/0177018 A1 | 7/2013 | Wijnands et al. | |
| 2013/0208582 A1 | 8/2013 | Wijnands et al. | |

OTHER PUBLICATIONS

"Multicast only Fast ReRoute"; Karan et al.; Network Working Group Internet Draft; Mar. 9, 2012.*
Bryant, et al., "Remote LFA FRR", Network Working Group, Internet Drat, draft-ietf-rtgwg-remote-lfa-02, May 2013, 15 pages, Internet Engineering Task Force Trust.
Wijnands, et al., "Using Multipoint LDP When the Backbone Has No Route to the Root", Internet Engineering Task Force, Request for Comments 6512, Feb. 2012, 12 pages, Internet Engineering Task Force Trust.

* cited by examiner

*Primary Examiner* — Benjamin H Elliott, IV
(74) *Attorney, Agent, or Firm* — Parker Ibrahim & Berg LLC; James M. Behmke; Stephen D. LeBarron

(57) ABSTRACT

In one embodiment, a node in a multicast label distribution protocol (mLDP) network determines a remote protecting node for a particular root node in the mLDP network. In addition, the node determines a protecting node address of the remote protecting node and a root node address of the particular root node, and establishes an mLDP label-switched path (LSP) via the remote protecting node by using the protecting node address as a root of an outer forwarding equivalent class (FEC) of a recursive FEC, and using the root node address as an inner FEC of the recursive FEC for the mLDP LSP. As such, when the remote protecting node is reached, the outer FEC is stripped and the remote protecting node continues establishing the mLDP LSP toward the particular root node.

20 Claims, 7 Drawing Sheets

MULTICAST LABEL DISTRIBUTION PROTOCOL OVER A REMOTE LOOP-FREE ALTERNATIVE

TECHNICAL FIELD

The present disclosure relates generally to computer networks, and, more particularly, to multicast label distribution protocol (mLDP) and loop-free alternates (LFAs).

BACKGROUND

When using multicast label distribution protocol (mLDP) multicast only fast reroute (MoFRR), such as described in the Internet Engineering Task Force (IETF) Internet Draft by Karan et al., entitled "Multicast only Fast Re-Route" <draft-karan-mofrr>, two upstream candidate label distribution protocol (LDP) neighbors are chosen for forwarding packets down a label-switched path (LSP). Only one of the neighbors is allowed to be accepting packets at the same time, such that the other one is blocking. It is typical that with MoFRR the candidate upstream LSRs are learned from equal cost multipath (ECMP) or loop-free alternate (LFA) routes. If there is a remote LFA, it cannot currently be used because the directly connected upstream LDP neighbor is likely not an LFA for reaching a corresponding root node.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a node in a multicast label distribution protocol (mLDP) network determines a remote protecting node for a particular root node in the mLDP network. In addition, the node determines a protecting node address of the remote protecting node and a root node address of the particular root node, and establishes an mLDP label-switched path (LSP) via the remote protecting node by using the protecting node address as a root of an outer forwarding equivalent class (FEC) of a recursive FEC, and using the root node address as an inner FEC of the recursive FEC for the mLDP LSP. As such, when the remote protecting node is reached, the outer FEC is stripped and the remote protecting node continues establishing the mLDP LSP toward the particular root node.

Description

A communication network comprises geographically distributed nodes (e.g., devices of a distributed data center or end-client devices such as personal computers and workstations, or other devices) interconnected by communication links for transporting data between end nodes. Various types of network are available and can include, for example, local area networks (LANs), wide area networks (WANs), etc. In addition, each of these various types of networks can support various communication technologies such as multicast, and non-multicast (e.g., unicast) communication. Each of these networks can connect the nodes over dedicated private communication links, or dispersed nodes over long-distance communications links such as common carrier telephone lines, optical lightpaths, synchronous optical networks (SONET), synchronous digital hierarchy (SDH) links, and others.

Figure 1:
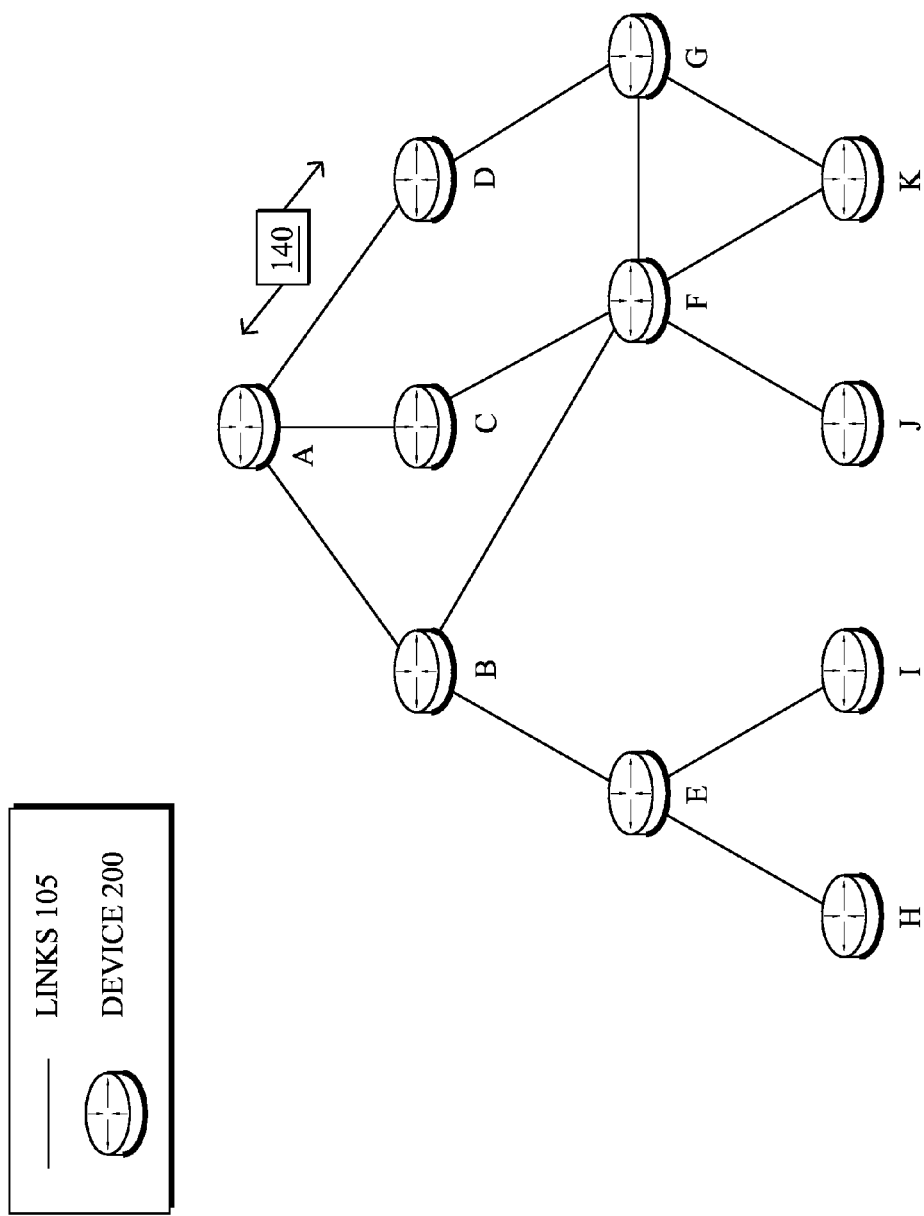
FIG. 1 illustrates an example communication network.

FIG. 1 is a schematic block diagram of an example communication network 100 illustratively comprising nodes/devices 200 (e.g., labeled as shown, "A"-"K," and described in FIG. 2 below) interconnected by various methods of communication. For instance, the links 105 may be wired links or shared media (e.g., wireless links, power-line communication (PLC) links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "head" node A, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols or other protocols where appropriate. In this context, a protocol consists of a set of rules defining how the nodes interact with each other.

Figure 2:
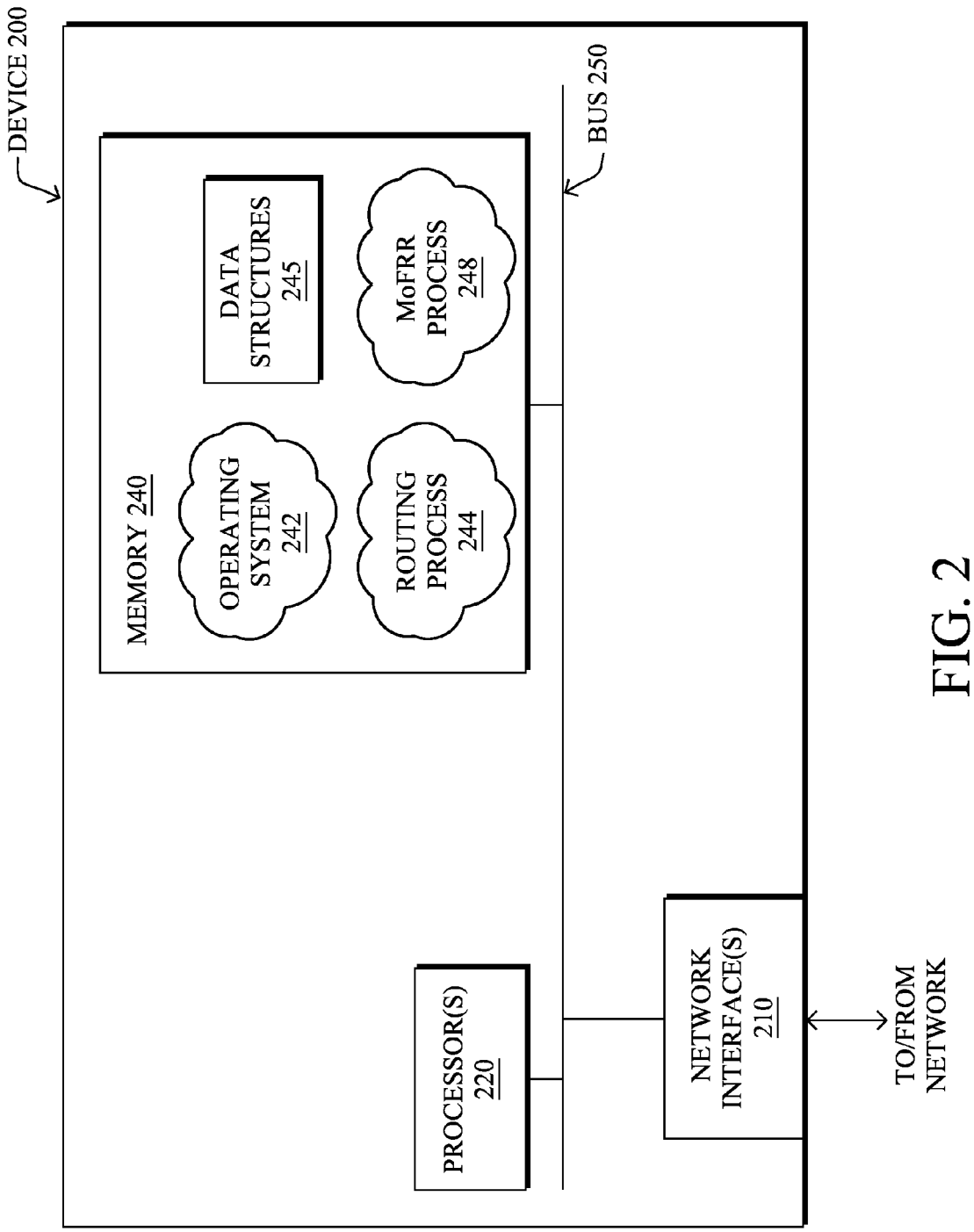
FIG. 2 illustrates an example network device/node.

FIG. 2 is a schematic block diagram of a simplified example device 200 that may be used with one or more embodiments described herein. For example, example device 200 can be any of the nodes shown in FIG. 1, and can include a router, a relay, a switch, etc.

Device 200 may comprise one or more network interfaces 210 (e.g., wired, wireless, etc.), at least one processor 220, and a memory 240 interconnected by a system bus 250. These network interface(s) 210 comprise the mechanical, electrical, and signaling circuitry for communicating data over network 100. Network interfaces 210 may be configured to transmit and/or receive data using a variety of different communication protocols. Note that each device may include two different types of network connections 210, e.g., wireless and wired/physical connections, and that the view herein is merely for illustration.

Memory 240 comprises a plurality of storage locations that are addressable by the processor 220 and the network interfaces 210 for storing software programs and data structures associated with the embodiments described herein. Processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and a multicast only fast reroute (MoFRR) process 248, as described herein. Note that while processes 244 and 248 are shown in centralized memory 240, additional embodiments provide for either of the processes to be specifically operated within the network interfaces 210 (e.g., process 248a as shown).

Note further that while both processes 244 and 248 are shown as installed in a memory 240, and therefore being implemented in software, these processes could be implemented in any of hardware (e.g., electronic circuitry), firmware, software, or a combination thereof. Alternatively, these processes may be configured on a storage medium for subsequent loading into memory 240. The storage medium can include a computer-readable medium encoded with a computer program, and can be any conventional storage medium that stores the processes thereon in tangible form. Examples of storage media include a floppy disk, a compact disk, a magnetic tape, a read only memory, an optical storage media, universal serial bus (USB) flash drive, etc. Alternatively, storage media can include a random access memory, or other type of electronic storage, located on a remote storage system and coupled to processor 220, via network interface 210.

As will be apparent to those skilled in the art other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, when using multicast label distribution protocol (mLDP) multicast only fast reroute (MoFRR), two upstream candidate label distribution protocol (LDP) neighbors are chosen for forwarding packets down a label-switched path (LSP). Only one of the neighbors is allowed to be accepting packets at the same time, such that the other one is blocking. It is typical that with MoFRR the candidate upstream LSRs are learned from equal cost multipath (ECMP) or loop-free alternate (LFA) routes. If there is a remote LFA, it cannot currently be used because the directly connected upstream LDP neighbor is likely not an LFA for reaching a corresponding root node.

Note that in current techniques, mLDP can be run with a remote node via Targeted mLDP. This could potentially be used between a downstream node N and a remote LFA node L. However, this does not produce the desired behavior, as the remote LFA node L will use a point-to-point (P2P) LSP from L to N. As such, there is no guarantee that this P2P LSP will not go via the link/node that is being avoided, thus rending this solution unusable.

The techniques herein, on the other hand, allow a Remote LFA to be used for mLDP candidate upstream neighbor. In particular, the techniques herein use the remote LFA node address in an mLDP recursive forwarding equivalent class (FEC) encoding to force an LSP to be setup via the LFA node.

Specifically, according to one or more embodiments of the disclosure as described in detail below, a node in a multicast label distribution protocol (mLDP) network determines a remote protecting node for a particular root node in the mLDP network. In addition, the node determines a protecting node address of the remote protecting node and a root node address of the particular root node, and establishes an mLDP label-switched path (LSP) via the remote protecting node by using the protecting node address as a root of an outer forwarding equivalent class (FEC) of a recursive FEC, and using the root node address as an inner FEC of the recursive FEC for the mLDP LSP. As such, when the remote protecting node is reached, the outer FEC is stripped and the remote protecting node continues establishing the mLDP LSP toward the particular root node.

Illustratively, the techniques described herein may be performed by hardware, software, and/or firmware, such as in accordance with the MoFRR process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as MPLS or other routing protocols, and as such, may be processed by similar components understood in the art that execute those protocols, accordingly.

Operationally, a Remote LFA (R-LFA) for a particular root R is a node in the network not directly connected to the node where we are resolving the route. In order to avoid a certain link/node, it can be assumed that it is desirable to build the mLDP LSP via the R-LFA node. However, there is currently no guarantee that the nodes along the path to reach the R-LFA node will not lead the mLDP LSP through the link/node that is to be avoided.

Figure 3:
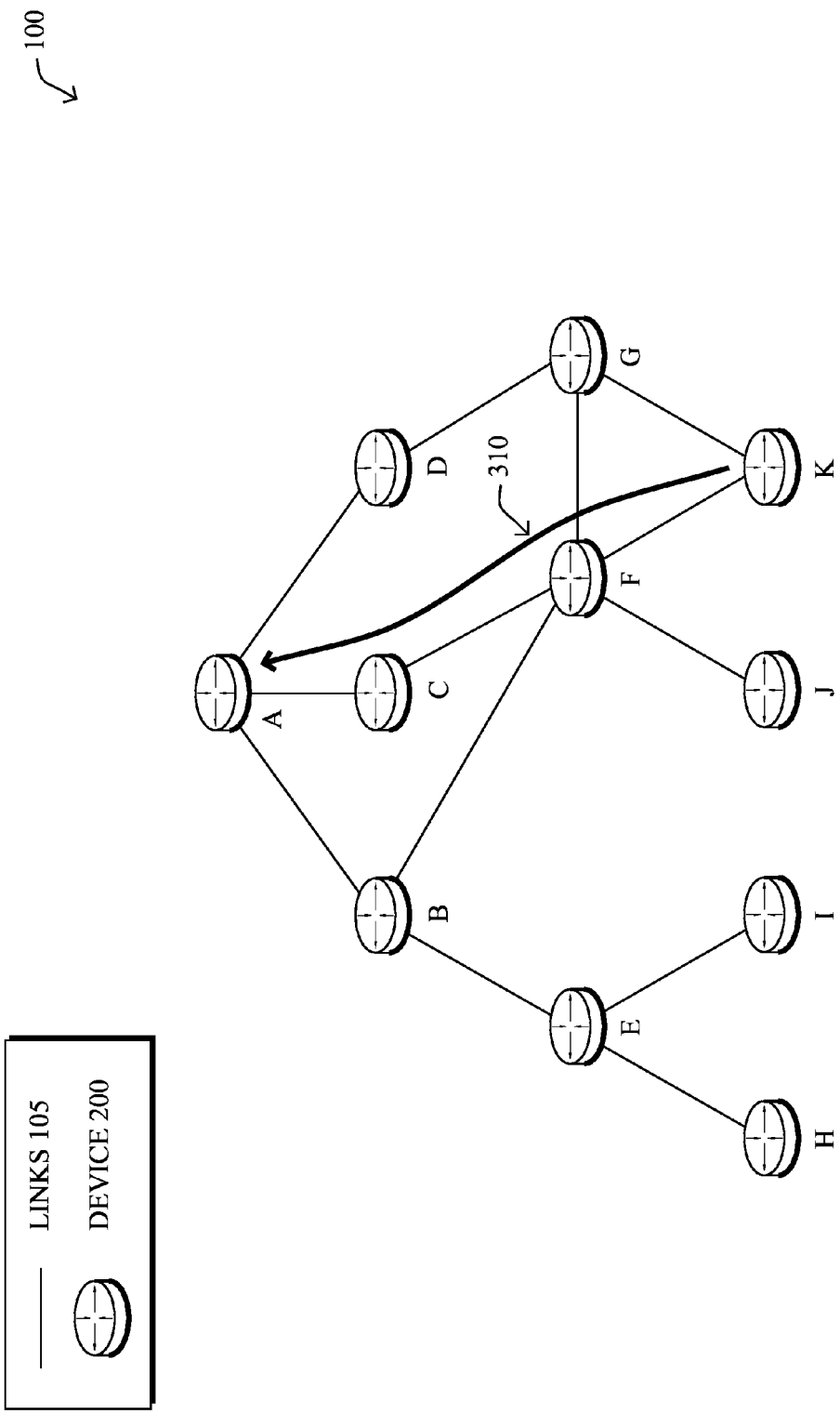
FIG. 3 illustrates an example view of the communication network establishing a multicast label distribution protocol (mLDP) label-switched path (LSP)

For example, FIG. 3 illustrates an example of building a primary mLDP LSP 310 from node K to F to C to root node A (K-F-C-A). Assuming that node C is to be avoided for protection reasons, a remote LFA node may be determined as node B.

Figure 4:
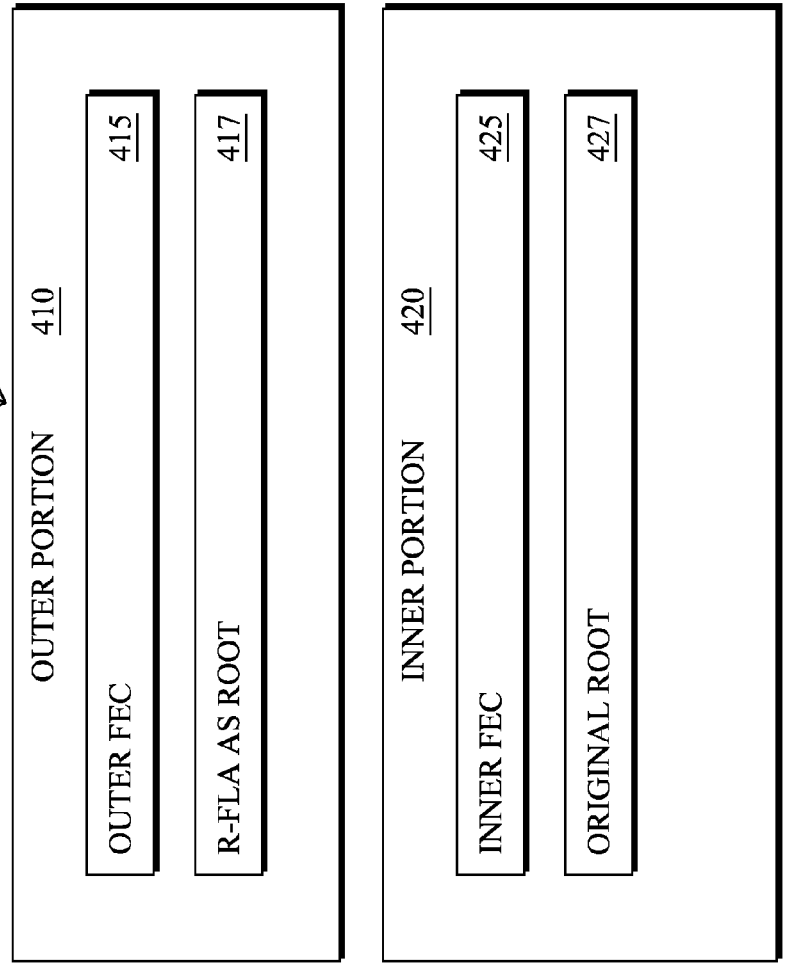
FIG. 4 illustrates an example of an mLDP LSP establishment message with recursive forwarding equivalent class (FEC)

In order to force a secondary mLDP LSP to be built via the R-LFA node (e.g., node B), the techniques herein illustratively use recursive FEC, such as described in the IETF Proposed Standard Request for Comment (RFC) 6512 by Wijnands et al., entitled "Using Multipoint LDP When the Backbone Has No Route to the Root". In particular, as shown in FIG. 4, the format of an mLDP LSP establishment message 400 may now contain, within an outer portion, the R-LFA node address (e.g., node B) as the Root node 417 of the outer FEC 415, while the inner FEC 425 of the inner portion 420 will have the original Root node 427 (e.g., node A). In this manner, a "recursive FEC" is a collection of fields within an establishment message 400 that includes an outer FEC portion corresponding to a first portion of the mLDP LSP to be established (e.g., with the protecting node address as a root), and an inner FEC portion (e.g., with the original root node address) for the remainder of the mLDP LSP to be established beyond the protecting node.

Figure 5A:
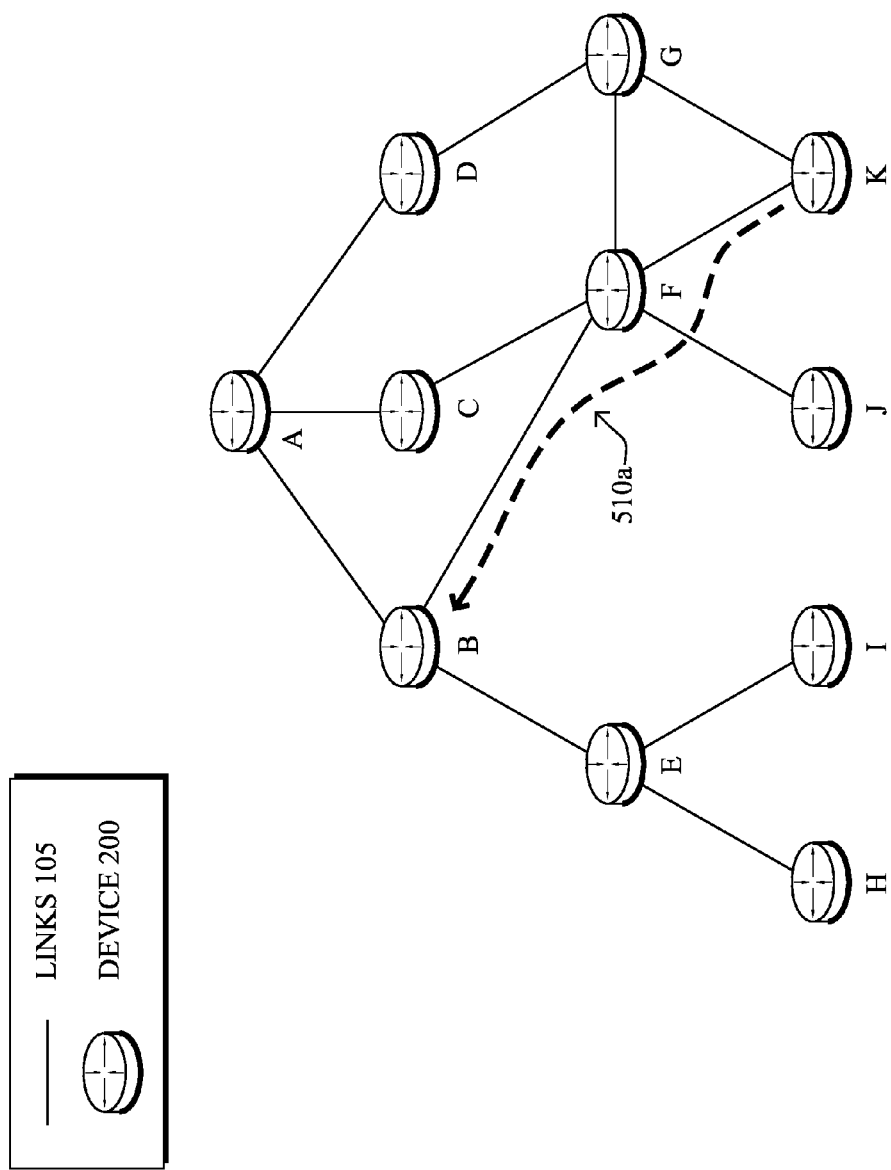
FIGS. 5A-5B illustrate an example view of the communication network establishing a secondary mLDP LSP over a remote loop-free alternate (LFA)
Figure 5B:
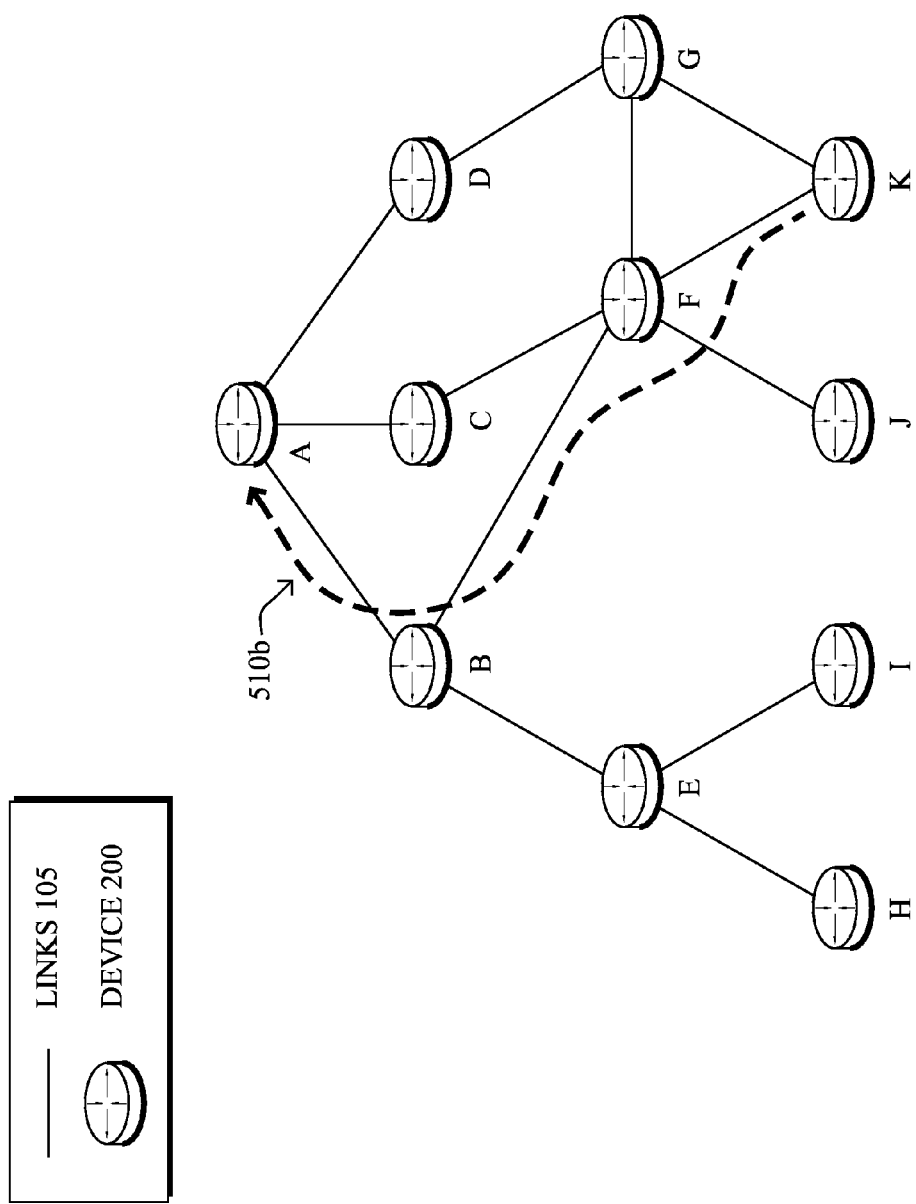

The result of this arrangement is illustrated in FIGS. 5A-5B, where in FIG. 5A, a "new" mLDP LSP 510 will be built to the R-LFA node (e.g., node B). As shown in FIG. 5B, when the R-LFA is reached, the outer FEC (outer portion 410) is stripped off of the message 400, and the R-LFA will start building the mLDP LSP to the original Root node according to the inner portion 420. In other words, according to the techniques herein, the mLDP LSP establishment message 400 forces the mLDP LSP to first visit the R-LFA node, and then continue the LSP setup from there to the original root node, avoiding the protected network elements.

Figure 6:
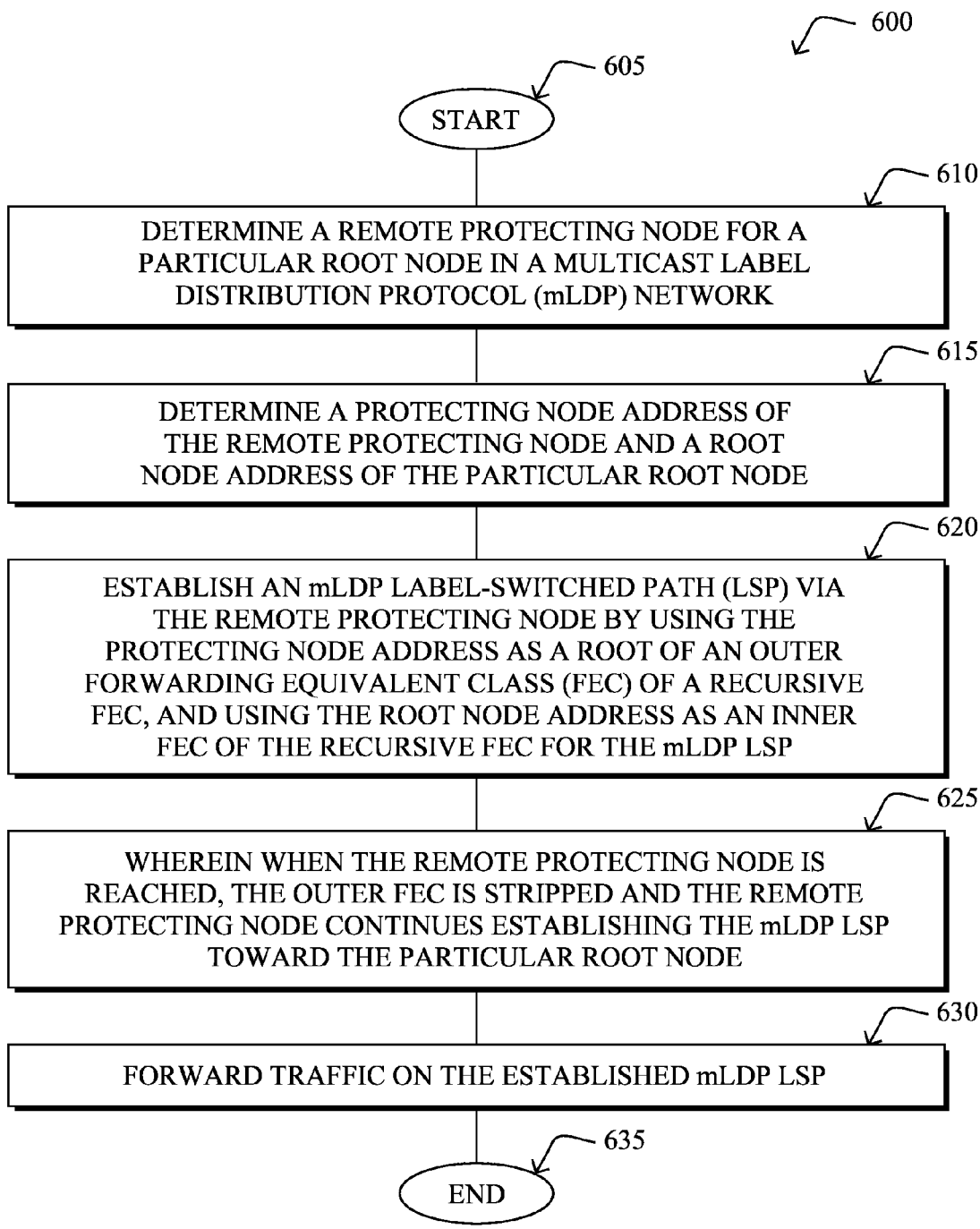
FIG. 6 illustrates an example simplified procedure for mLDP over a remote LFA in a computer network, e.g., for mLDP-based multicast only fast reroute (MoFRR) with remote LFA neighbors.

FIG. 6 illustrates an example simplified procedure 600 for mLDP over a remote LFA in a computer network in accordance with one or more embodiments described herein, e.g., for mLDP-based MoFRR with remote LFA neighbors. The procedure 600 may start at step 605, and continues to step 610, where, as described in greater detail above, a node (e.g., node K) determines a remote protecting node (e.g., remote LFA node B) for a particular root node (e.g., node A) in an mLDP network 100. For example, the protecting node may be determined to avoid a certain network element (e.g., node C), such as a link or a node in the mLDP network.

As described above, the node determines a protecting node address of the remote protecting node and a root node address of the particular root node in step 615, and establishes an mLDP LSP (e.g., for MoFRR) via the remote protecting node in step 620 by using the protecting node address 417 as a root of an outer FEC 415 of a recursive FEC, and using the root node address 427 as an inner FEC 425 of the recursive FEC for the mLDP LSP. (As noted, the recursive FEC may illustratively be in accordance with the RFC 6512 protocol.)

In step 625, once the remote protecting node is reached, the outer FEC (portion 410) is stripped and the remote protecting node continues establishing the mLDP LSP toward the particular root node based on the inner FEC (inner portion 420).

Once established, traffic may be forwarded on the established mLDP LSP in step 630, such as in response to a failure of the protected element (e.g., node C) in accordance with MoFRR techniques. The procedure 600 may illustratively ends in step 635, though notably with the ability to re-signal mLDP LSPs and/or forward additional traffic over the established mLDP LSPs, accordingly.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for mLDP over a remote LFA in a computer network. In particular, the techniques herein support mLDP-based MoFRR with remote LFA neighbors. For instance, the techniques herein build an LSP from a "PQ node" (e.g., as defined in the IETF Internet Draft by Bryant et al., entitled "Remote LFA FRR" <draft-ietf-rtgwg-remote-lfa>) to the protecting node, that ensures the failed link is not used. This is achieved by forcing the original mLDP LSP setup through the PQ node. The alternative mechanism described above of using targeted mLDP and the unicast LSP from the PQ node to the protecting node would result in an LSP constructed with the reverse routing information than that used to determine the PQ node, which due to asymmetric routing, may un-desirously end up traversing the protected/failed link.

While there have been shown and described illustrative embodiments that provide for mLDP over a remote LFA in a computer network, it is to be understood that various other adaptations and modifications may be made within the spirit and scope of the embodiments herein. For example, the embodiments have been shown and described herein with relation to specific types of networks and/or protocols. However, the embodiments in their broader sense are not as limited, and may, in fact, be used with other types of communication networks and/or protocols. In addition, while certain specific protocols are shown, such as mLDP and MoFRR as currently understood, other suitable protocols may be used, accordingly. Also, while recursive FEC is shown and described, alternatives may also be used, such as hierarchical LSPs.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining a remote protecting node for a particular root node in a multicast label distribution protocol (mLDP) network;
    determining a protecting node address of the remote protecting node and a root node address of the particular root node; and
    establishing an mLDP label-switched path (LSP) via the remote protecting node by using the protecting node address as a root of an outer forwarding equivalent class (FEC) of a recursive FEC, and using the root node address as an inner FEC of the recursive FEC for the mLDP LSP;
    wherein when the remote protecting node is reached, the outer FEC is stripped and the remote protecting node continues establishing the mLDP LSP toward the particular root node.

2. The method as in claim 1, further comprising:
    forwarding traffic on the established mLDP LSP.

3. The method as in claim 1, wherein the remote protecting node is a remote loop-free alternate (LFA).

4. The method as in claim 1, wherein the mLDP LSP is for multicast only fast reroute (MoFRR).

5. The method as in claim 1, wherein determining the remote protecting node comprises:
    determining the remote protecting node to avoid a certain network element.

6. The method as in claim 5, wherein the certain network element is one of either a link or a node in the mLDP network.

7. The method as in claim 1, wherein the recursive FEC is in accordance with the request for comment (RFC) 6512 protocol.

8. An apparatus, comprising:
    one or more network interfaces to communicate within a multicast label distribution protocol (mLDP) network;
    a processor coupled to the network interfaces and adapted to execute one or more processes; and
    a memory configured to store a process executable by the processor, the process when executed operable to:
        determine a remote protecting node for a particular root node in the mLDP network;
        determine a protecting node address of the remote protecting node and a root node address of the particular root node; and
        establish an mLDP label-switched path (LSP) via the remote protecting node by using the protecting node address as a root of an outer forwarding equivalent class (FEC) of a recursive FEC, and using the root node address as an inner FEC of the recursive FEC for the mLDP LSP;

wherein when the remote protecting node is reached, the outer FEC is stripped and the remote protecting node continues establishing the mLDP LSP toward the particular root node.

9. The apparatus as in claim 8, wherein the process when executed is further operable to:

forward traffic on the established mLDP LSP.

10. The apparatus as in claim 8, wherein the remote protecting node is a remote loop-free alternate (LFA).

11. The apparatus as in claim 8, wherein the mLDP LSP is for multicast only fast reroute (MoFRR).

12. The apparatus as in claim 8, wherein the process when executed to determine the remote protecting node is further operable to:

determine the remote protecting node to avoid a certain network element.

13. The apparatus as in claim 12, wherein the certain network element is one of either a link or a node in the mLDP network.

14. The apparatus as in claim 8, wherein the recursive FEC is in accordance with the request for comment (RFC) 6512 protocol.

15. A tangible, non-transitory, computer-readable media having software encoded thereon, the software when executed by a processor operable to:

determine a remote protecting node for a particular root node in the mLDP network;

determine a protecting node address of the remote protecting node and a root node address of the particular root node; and establish an mLDP label-switched path (LSP) via the remote protecting node by using the protecting node address as a root of an outer forwarding equivalent class (FEC) of a recursive FEC, and using the root node address as an inner FEC of the recursive FEC for the mLDP LSP;

wherein when the remote protecting node is reached, the outer FEC is stripped and the remote protecting node continues establishing the mLDP LSP toward the particular root node.

16. The computer-readable media as in claim 15, wherein the software when executed is further operable to:

forward traffic on the established mLDP LSP.

17. The computer-readable media as in claim 15, wherein the remote protecting node is a remote loop-free alternate (LFA).

18. The computer-readable media as in claim 15, wherein the mLDP LSP is for multicast only fast reroute (MoFRR).

19. The computer-readable media as in claim 15, wherein the software when executed to determine the remote protecting node is further operable to:

determine the remote protecting node to avoid a certain network element.

20. The computer-readable media as in claim 15, wherein the recursive FEC is in accordance with the request for comment (RFC) 6512 protocol.

* * * * *